United States Patent
Mondelore

(10) Patent No.: US 9,308,442 B2
(45) Date of Patent: Apr. 12, 2016

(54) CONTROLLER-BASED VIDEO EDITING

(71) Applicant: Microsoft Corporation, Redmond, WA (US)

(72) Inventor: David Mondelore, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 14/076,343

(22) Filed: Nov. 11, 2013

(65) Prior Publication Data

US 2015/0133213 A1    May 14, 2015

(51) Int. Cl.
*A63F 13/06* (2006.01)
*A63F 13/20* (2014.01)
*G11B 27/034* (2006.01)
*G11B 27/34* (2006.01)

(52) U.S. Cl.
CPC .............. *A63F 13/06* (2013.01); *G11B 27/034* (2013.01); *G11B 27/34* (2013.01)

(58) Field of Classification Search
CPC .......... A63F 13/06; A63F 13/10; A63F 13/12
See application file for complete search history.

(56) References Cited

U.S. PATENT DOCUMENTS

| | | | |
|---|---|---|---|
| 5,477,337 A | 12/1995 | Schuler | |
| D366,261 S | 1/1996 | Splane, Jr. et al. | |
| 6,034,679 A | 3/2000 | Mcgrath | |
| 6,102,802 A * | 8/2000 | Armstrong | 463/37 |
| 6,597,375 B1 | 7/2003 | Yawitz | |
| 6,699,127 B1 * | 3/2004 | Lobb et al. | 463/43 |
| 6,811,491 B1 | 11/2004 | Levenberg et al. | |
| 7,830,570 B2 | 11/2010 | Morita et al. | |
| 2012/0281960 A1 | 11/2012 | Boncha | |

FOREIGN PATENT DOCUMENTS

| | | |
|---|---|---|
| EP | 2409744 A1 | 1/2012 |
| WO | 9806098 A1 | 2/1998 |
| WO | 2009094611 A2 | 7/2009 |

OTHER PUBLICATIONS

Cade, DL, "Cullinator Lets You Sort and Edit Photos Using a Video Game Controller", Published on: Feb. 28, 2013, Available at: http://petapixel.com/2013/02/28/cullinator-lets-you-sort-and-edit-photos-using-a-video-game-controller/.

(Continued)

*Primary Examiner* — Omkar Deodhar
(74) *Attorney, Agent, or Firm* — Aaron Chatterjee; Judy Yee; Micky Minhas

(57) ABSTRACT

Example apparatus and methods use a video game controller to edit videos down to clips. A game controller may include a variety of elements (e.g., thumb-sticks, buttons) configured to provide inputs. Inputs may be received simultaneously from multiple controller elements. The inputs may be used to simultaneously update terminal points for a clip being selected from a video. The controller elements may be thumb-sticks. In one embodiment, the associations between which thumb-stick will be used to control a starting frame and which thumb-stick will be used to control an ending frame may be user-configurable. Similarly, the elements on the controller that are used to provide the two simultaneous inputs may be user-configurable. The video from which the clip is being clipped may have been generated by a video game played on a video game console as controlled by the game controller that will also edit the clip.

15 Claims, 10 Drawing Sheets

(56) References Cited

OTHER PUBLICATIONS

Cade, DL, "Speed Up Your Lightroom, Editing Using a GamePad Controller", Published on: Apr. 8, 2013, Available at: http://petapixel.com/2013/04/08/speed-up-your-lightroom-editing-using-a-gamepad-controller/.

Written Opinion of International Search Authority Dated Feb. 24, 2015.

"International Search Report and Written Opinion Issued in PCT Patent Application No. PCT/US2014/063615", Mailed Date: Feb. 24, 2015, 10 Pages.

"Second Written Opinion Issued in PCT Patent Application No. PCT/US2014/063615", Mailed Date: Oct. 8, 2015, 7 Pages.

"International Preliminary Report on Patentability issued in PCT Application No. PCT/US2014/063615", Mailed Date Jan. 12, 2016, 8 Pages.

\* cited by examiner

CONTROLLER-BASED VIDEO EDITING

BACKGROUND

Part of the experience of playing a video game is doing something remarkable like scoring a goal against an all-star opponent, defeating an arch-rival, or dispatching a particularly heinous monster. Another part of the experience is being able to relive and even share those magical moments. For example, a gamer may wish to relive their game-winning goal, to show their friends how they maneuvered the players to set up the game-winning goal, or to show how to unlock the entrance to a secret passage. Similarly, part of the experience of having a phone or tablet or other device that can record video is being able to capture interesting or memorable events and then being able to relive or share those interesting or memorable events. Unfortunately, the memorable nuggets of video gold may be buried in an overburden of ore in a highlight video that is too long.

Conventionally, a user may have been able to capture video of an event on one device (e.g., video game console, smart phone, tablet) using one application but then may have had to use another application or even another device to edit the video. For example, a video like a video game highlight may have been generated on a video game console by a player using a video game controller but then not edited using the video game controller or console. Instead, the highlight may have been migrated to another device and edited using a computer with a keyboard and mouse to control inputs to a separate editing application. This multi-step process separated the experience of generating highlights and editing highlights, which may have dis-incentivized gamers or others to produce edited highlights. Thus, what could have been interesting highlight clips, if edited to an appropriately short length with an appropriate entry point, may languish as overly long replays. Users may have been reluctant to watch unedited videos since they may have tended to run too long and may have tended to include extraneous material or inappropriate entry and exit points.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards editing a video clip (e.g., video game highlight) using a standard game controller. Conventionally, editing a video clip like a video game highlight was not performed using the video game controller or console. Instead, the highlight may have been edited using a computer with a keyboard and mouse to control input. Or, a highlight may have been edited using expensive, custom-designed hardware Example methods and apparatus use a game controller to establish terminal points (e.g., beginning, end) for a clip and thus to control the length of the clip using input apparatus provided by the controller. For example, the thumb-sticks provided on a controller may be used to move a beginning point or an ending point for a clip being selected from a longer video. Other interface components (e.g., button, d-pad, trigger, bumper) may be used together with the thumb-sticks to signal that a terminal point is to be moved to a desired position, to signal that a terminal point is to be reverted to an original position, or to perform other editing actions.

Example apparatus and methods may logically connect the left thumb-stick on a game controller associated with a game console to the starting point for a clip. The game console may be the device on which a video game is played as controlled by the game controller. The game console may also be the device from which a video to be edited is acquired. Example apparatus and methods may logically connect the right thumb-stick on the game controller to the ending point for a dip. The beginning and ending points of the clip can be manipulated using the left and right thumb-sticks respectively. Since there are two separate controls, and since some gamers are very adept at using both thumbs at once, both the beginning and ending position may be edited simultaneously.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example methods and apparatus are directed towards editing a video to produce a clip (e.g., video game highlight) using a game controller. A short video may include a first number of frames (e.g., 30,000 frames). In the era of celluloid video film, a short highlight would be "clipped" from a video tape using a mechanical cutting device referred to as a splicer. The video tape may have been hundreds of yards long and stored on large metal spools. The clip may have included just a hundred frames. In the digital era, the term "clip" is still used to refer to a subset of frames selected from a larger set of frames. A video game may continually record the last five minutes of game play in a circular buffer. At thirty frames per second, the video may include 9,000 frames. A separate device (e.g., digital video recorder DVR) or a separate application (e.g., virtual DVR) may record hours of frames. Both the hours of frames and the last five minutes as recorded in the 9,000 frames may be referred to as a video. A shorter highlight selected from the longer video may be referred to as a highlight clip or clip. The shorter highlight may be, for example, three seconds long and may include just 90 frames. While a mechanical cutting device is not used to edit digital video data, a logical cut is performed and thus the shorter highlight may still be referred to as a clip.

Conventionally, editing a clip like a video game highlight was not performed using the video game controller or console. Instead, the clip may have been edited using a computer with a keyboard and mouse to control input. Or, a clip may have been edited using expensive, custom-designed hardware. Example methods and apparatus use a game controller to trim or control the length of a clip using, for example, the thumb-sticks provided on the controller. A thumb-stick may be used to navigate through a video to find a desired beginning point or ending point for the clip. The thumb-stick may also be used to move a beginning point or an end point. Other interface components (e.g., buttons, d-pad, triggers, bumpers) may be used together with a thumb-stick(s) to signal that a beginning or end point is to be moved to a desired position, reverted to an original position, or otherwise repositioned.

Figure 10:
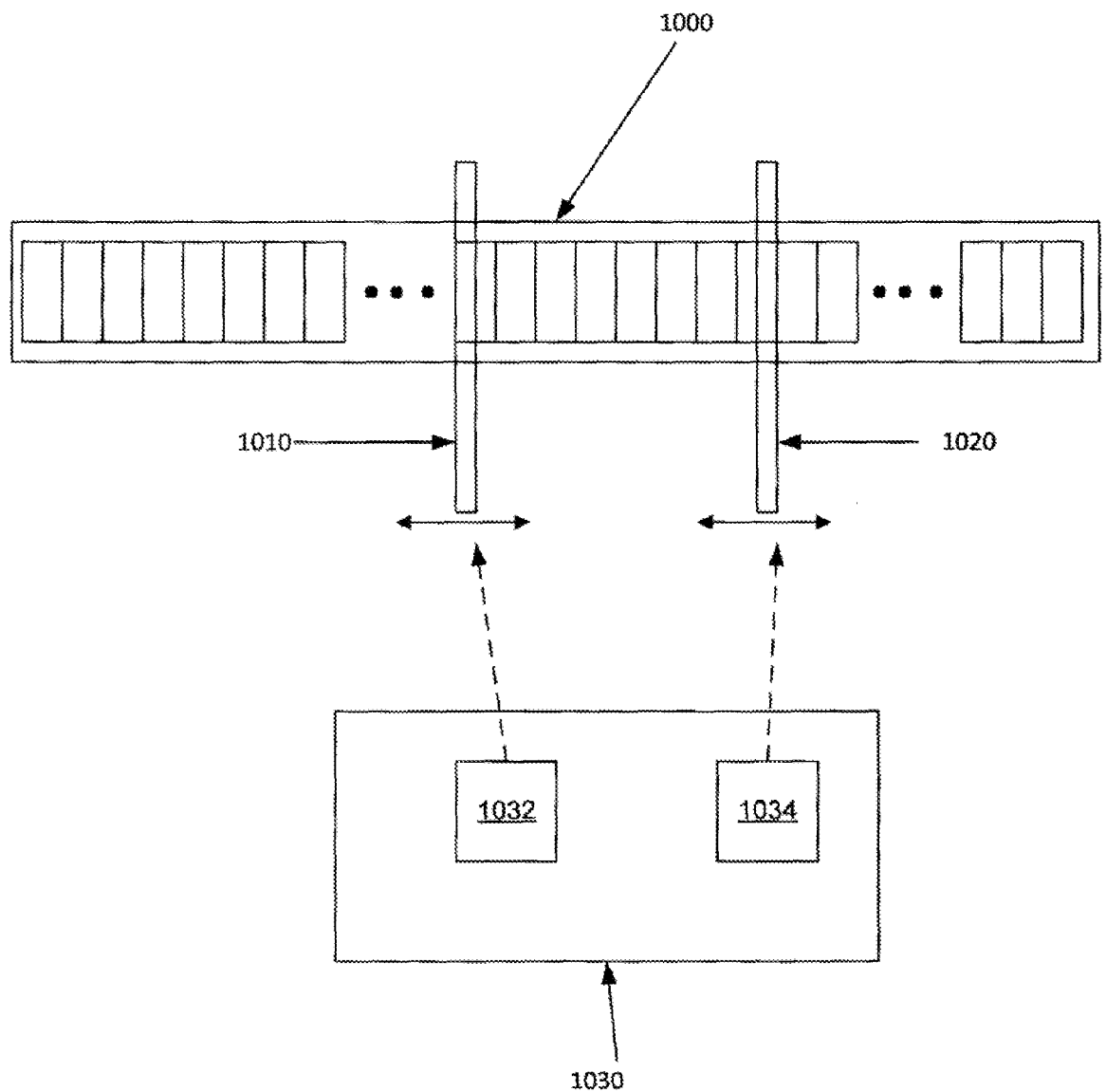
FIG. 10 illustrates an example controller manipulating the start frame and end frame for a dip.

As illustrated in FIG. 10, example apparatus and methods may logically connect the left thumb-stick 1032 on a game controller 1030 associated with a game console to the starting point 1010 for a clip and may logically connect the right thumb-stick 1034 on the game controller 1030 to the ending point 1020 for a clip. In one embodiment, the left thumb-stick 1032 may be used to control the start offset into a clip and the right thumb-stick 1034 may be used to control the duration of the segment to which the clip is bound. Using the thumb-sticks or other controls to control starting offset and duration facilitates having multiple clips exist in a segment of a longer video.

The beginning point 1010 and ending point 1020 of the clip can be manipulated using the left 1032 and right 1034 thumb-sticks respectively. In one embodiment, the logical connection between a controller input device (e.g., thumb-stick) and a terminal point may be user-configurable. Since there are two separate terminal points, two separate controls on the game controller 1030 may be used. Since some gamers are very adept at using both thumbs at once, both the entry point (e.g., beginning) and exit point (e.g., ending) for the clip may be edited simultaneously. Being able to reposition the beginning and ending of a clip simultaneously may reduce the amount of time required to produce clips like video game highlight clips. Additionally, since gamers' thumbs or other digits may be highly trained, fine-grained control (e g., frame level accuracy) may be achieved using game controller input devices even when acceleration heuristics are employed to speed navigation through a longer video.

Since editing a video game highlight clip may be performed using the controller that was used to play the video game, and since the editing may be performed using the device (e.g., game console) that was used to play the game, highlight clip editing may be easier, more intuitive, and more tightly coupled to highlight video generation. Easier, more intuitive, and more tightly coupled editing and generation may incentivize gamers to produce edited highlight clips that are shorter, that have more appropriate entry and exit points, and that get right to the point without extraneous material. Additionally, being able to easily move starting and ending points may facilitate producing a collection of clips that may be blended together more seamlessly since entry and exit points and segue points may be more easily manipulated.

In one embodiment, video from other devices (e.g., smart phone, tablet, digital video camera) may be made available to the game console and thus may be edited using the game controller based approach. In one embodiment, a tablet or other device with a touch or hover sensitive surface may be configured with a virtual game controller and virtual controls (e.g., thumb-sticks). In this embodiment, the game controller based approach is carried out using virtual thumb-sticks instead of actual thumb-sticks. Regardless of whether the thumb-stick or other input device is physical or virtual, both the beginning point and the end point for a clip may be manipulated simultaneously.

Figure 1:
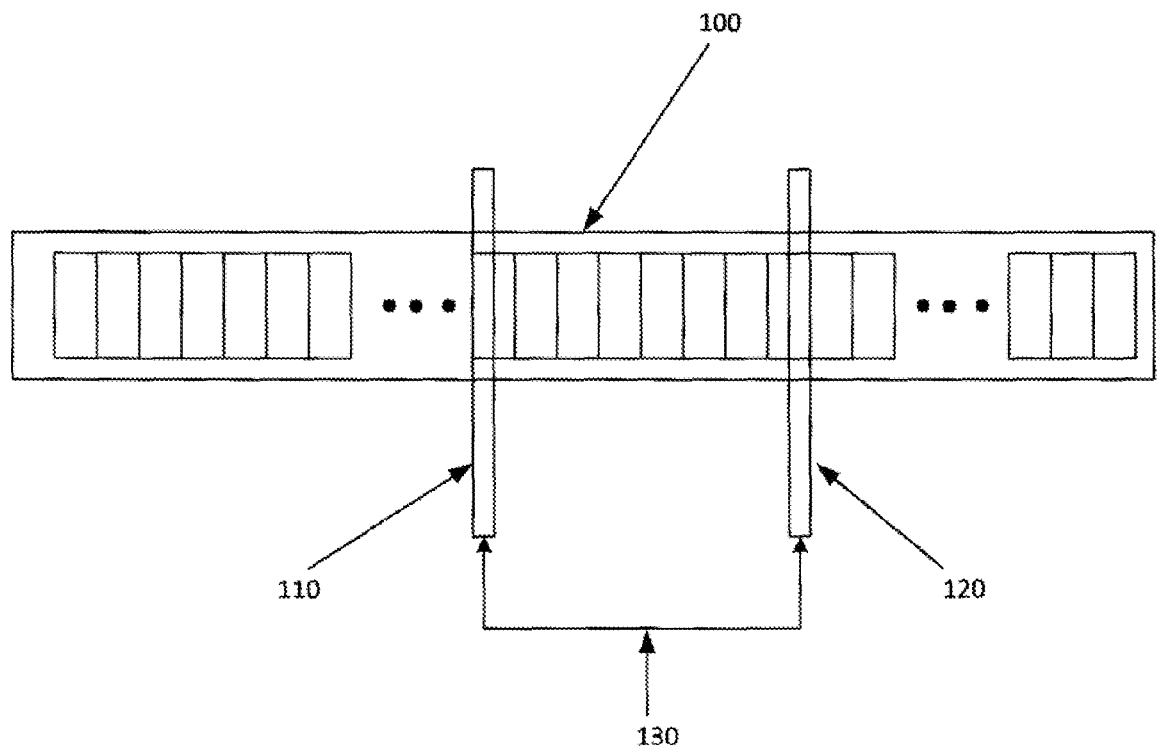
FIG. 1 illustrates an example video from which a highlight clip is being clipped.

FIG. 1 illustrates a video 100 that includes a collection of frames. An initial beginning point 110 and an initial ending point 120 for a clip 130 are illustrated. There may be a maximum clip size (e.g., 15 seconds, 450 frames) or a minimum clip size (e.g., 1 second, 30 frames). Thus, in one embodiment, a user may be prevented from moving the two terminal points too close together or too far apart. Different feedback (e.g., flashing endpoint, sound, vibration in controller) may be provided to indicate that an illegal terminal point position has been attempted.

Figure 2:
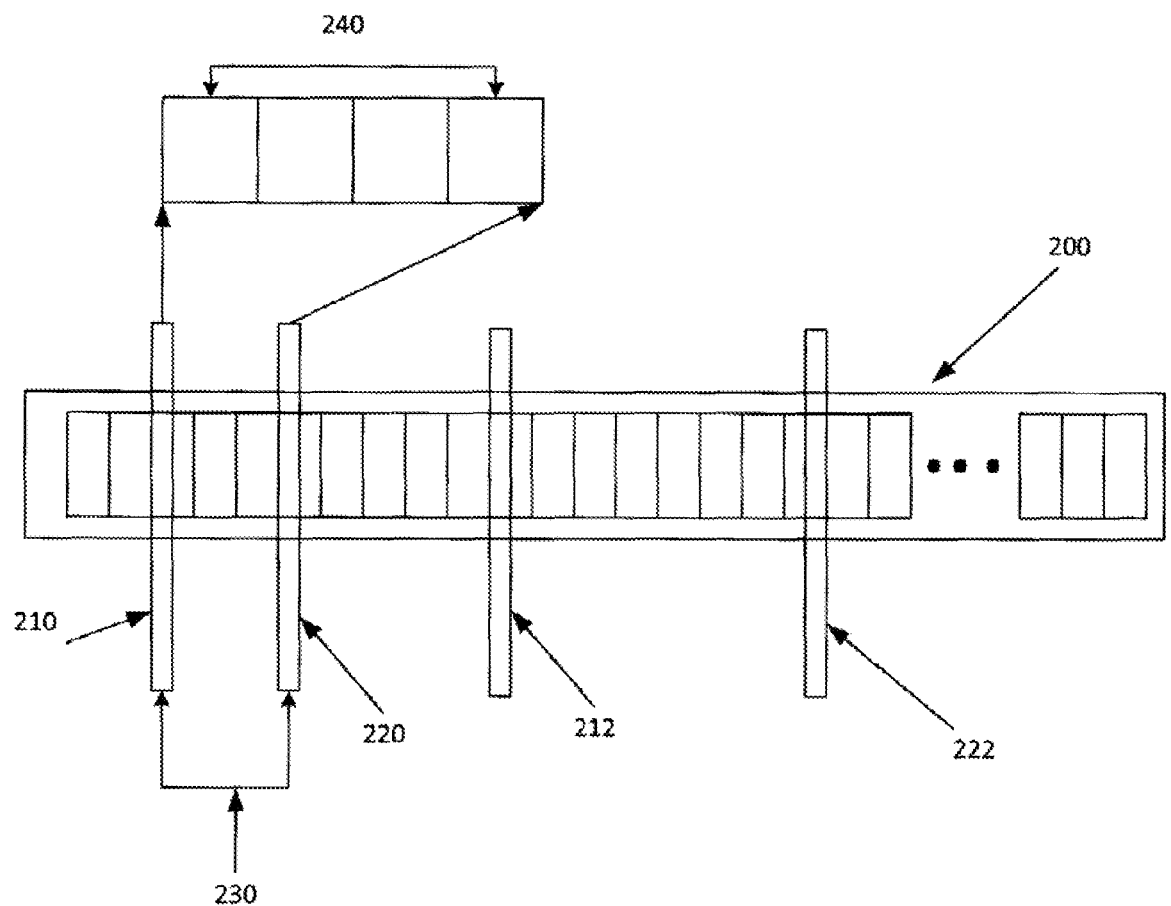
FIG. 2 illustrates an example video from which a highlight clip is being clipped.

FIG. 2 illustrates a video 200 from which a clip 230 has been produced. The terminal points for clip 230 have been manipulated. The beginning point 210 has been repositioned to the left from an initial beginning point 212. The initial beginning point 212 may have been established in a previous editing session, may have been established by the generator of the video, may have been positioned randomly, or may have been established in other ways. The beginning point 210 may have been manipulated using the left thumb-stick on a game controller. For example, the person editing the clip may have pushed and held the left thumb-stick to the left to move the beginning point 210, may have overshot their intended location, and then may have nudged the left thumb-stick to the right to put the beginning point 210 at their intended location. The user may then have pressed another element on the game controller (e.g., left trigger button) to identify that the beginning point 210 should be moved as indicated. In one embodiment, no additional action is required to "confirm" the repositioning of a terminal point. The terminal point is simply repositioned using the thumb-stick. The ending point 220 has also been repositioned to the left of an initial ending point 222. The initial ending point 222 may have been established in a previous editing session, may have been established by the video generator, or may have been established in other ways. The ending point 220 may have been manipulated using the right thumb-stick on the game-controller. For example, the person editing the clip may have pushed and held the right thumb-stick to the left to move the ending point 220, may have undershot their intended location, and then may have nudged the right thumb-stick to the left to put the ending point 220 at their intended location. The user may then have pressed another element on the game controller (e.g., right trigger button) to identify that the ending point 220 should be moved as indicated, or the endpoint 220 may simply be moved by the thumb-stick without any additional confirmation action. The user may have moved the beginning point 210 and the ending point 220 simultaneously.

In one embodiment, a preview 240 of the clip 230 that is defined by beginning point 210 and ending point 220 may be displayed. The preview 240 may display the contents of the frames in the clip 230 while the representation of the frames in video 200 that are used to navigate or position the terminal points may not present the contents of the frames. The preview 240 may be updated in real-time as the user manipulates the beginning or ending points. A user may watch the preview 240 and decide to have the clip 230 revert to the initial beginning point 212 and the initial ending point 222. In one embodiment, the terminal points may be reverted by pressing another element on the game controller. For example, a user may press one of the buttons (e.g., X button, left trigger) to revert a beginning point, may press another of the buttons (e.g., B button, right trigger) to revert an ending point, or may press another button (e.g., Y button) to revert both the beginning point and ending point. In one embodiment, the buttons or actions for reverting a terminal point may be user-configurable.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
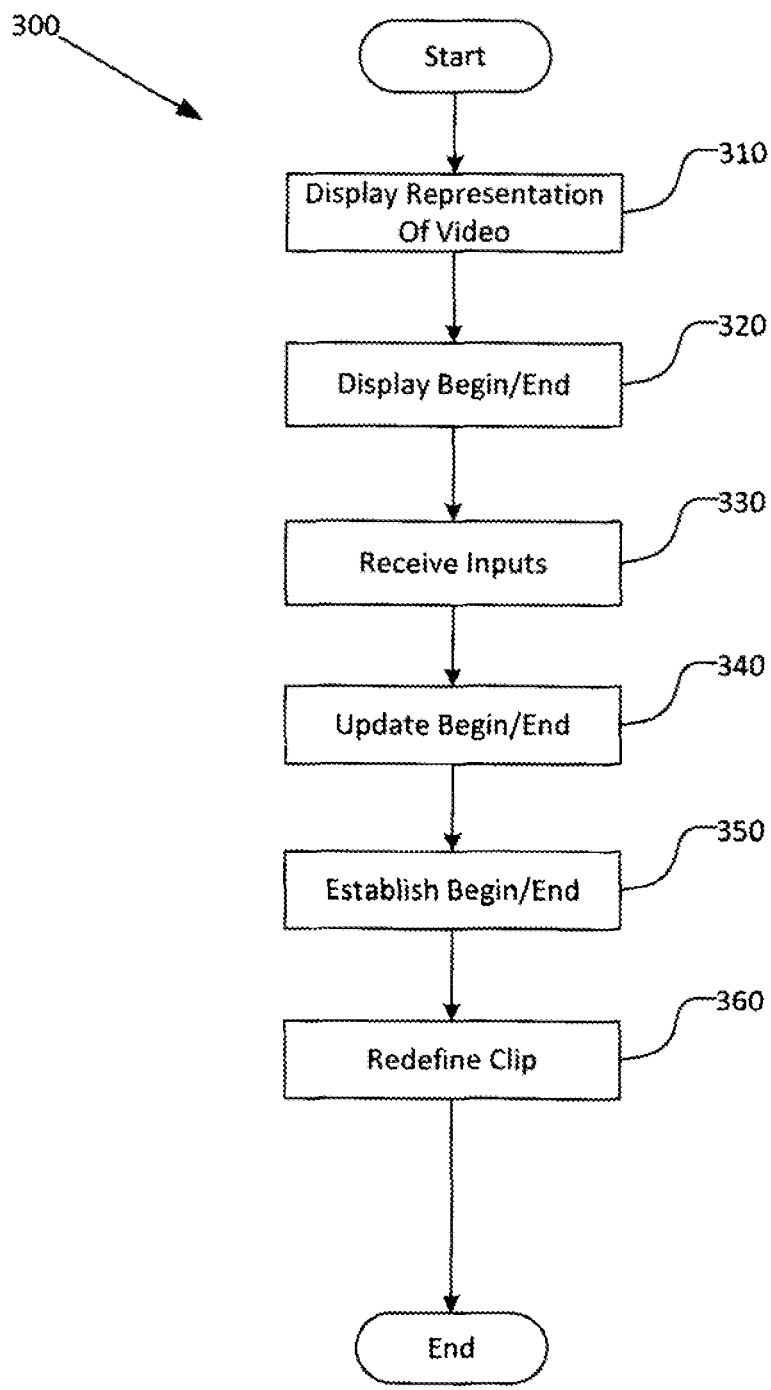
FIG. 3 illustrates an example method associated with controller-based video editing.

FIG. 3 illustrates an example method 300 associated with controller-based video editing. Method 300 includes, at 310, displaying, on a device controlled by a game controller, a representation of a video. The video may be a collection of frames. Therefore, the representation may be, for example, a graphic showing the collection of frames in a smaller-scale to facilitate navigating through the collection of frames. In one embodiment, the graphic may show the content of the frames while in another embodiment the graphic may only depict the existence of the frames without displaying their content. Other graphics may be employed. The video being processed by method 300 may come from different sources. In one embodiment, the video may have been generated on the device controlled by the game controller. For example, the video may have been generated from a video game played on the device while the device was controlled by the game controller and while the video game was controlled by the game controller. In other embodiments, the video may be imported from a device (e.g., digital camera) other than the device controlled by the game controller.

Method 300 also includes, at 320, displaying, on the device, a representation of a beginning point for a clip in the video and a representation of an ending point for the clip in the video. The clip may be a subset of the collection of frames. The representation of the beginning point may be, for example, a graphic that identifies which frame in the collection of frames will be the first frame in the clip. The graphic may be, for example, a lens, a selection tool, a pointer, or other indicator that facilitates navigating to a desired frame. The representation of the ending point may also be a graphic that identifies which frame in the collection of frames will be the last frame in the clip.

Method 300 also includes, at 330, receiving a first input from a first input element on the game controller or receiving a second, different input from a second input element on the game controller. In one embodiment, the first input and the second input may be received simultaneously. Since the game controller includes at least two separate input elements (e.g., thumb-sticks, buttons, triggers, d-pad) a user may manipulate two separate input elements associated with manipulating the beginning frame and the ending frame at the same time. In one embodiment, the first input element is a left thumb-stick and the second input element is a right thumb-stick. In one embodiment, the elements that are associated with manipulating the beginning frame and the ending frame may be user-selectable.

In one embodiment, the game controller may be a virtual game controller that is displayed on an apparatus with a touch or hover sensitive input/output element. In this embodiment, the first input may be received from a first virtual input element on the virtual game controller and the second input may be received from a second virtual input element on the virtual game controller.

Method 300 also includes, at 340, selectively updating the representation of the beginning point in response to the input from the first input element or selectively updating the representation of the ending point in response to the input from the second input element. Selectively updating a representation may include, for example, moving the representation from a first location to a second location. In one embodiment, as a user presses the left thumb-stick to the left the beginning point will move to the left. Similarly, as the user presses the right thumb-stick to the right the ending point will move to the right. Updating the representation may include, for example, moving a representation graphic to a different position with respect to a video graphic or moving the video graphic with respect to the representation graphic. Since the inputs may be received simultaneously at 330, in one embodiment, the representation of the beginning point and the representation of the ending point may be manipulated simultaneously.

In one embodiment, the inputs from an input element may include both a direction and a magnitude. The direction may be determined by a direction in which a user manipulates a user input element and the magnitude may be determined, for example, by the length of time the user continuously indicates the direction. Thus, updating the representation of the beginning point or the representation of the ending point may occur at a first rate when an input results from an input element being manipulated in a first way and may occur at a second, different rate when the input results from the input element being manipulated in a second different way.

Method 300 also includes, at 350, establishing the beginning point based on the representation of the beginning point or establishing the ending point based on the representation of the ending point. Establishing the beginning point may include, for example, recording a frame number in a memory, recording a start time in a memory, copying a frame, generating a signal, or other action that produces a concrete, tangible result. Establishing the ending point may include, for example, recording a frame number in a memory, recording an end time in a memory, copying a frame, generating a signal, or other action that produces a concrete, tangible result.

Method 300 also includes, at 360, redefining the clip based, at least in part, on the beginning point and the ending point. In one embodiment, defining or redefining a clip may include storing information from which a clip can be recreated from a video. For example, data identifying the video name, video location, clip beginning frame, and clip ending frame may be stored. In another embodiment, defining or redefining a clip may include storing frames from which the clip can be displayed. In this embodiment, data identifying the clip name and the clip location may be stored and the actual frames of the clip may be stored. In one embodiment, storing the actual frames of the clip may involve deleting other frames from the video to leave just the clip behind.

Figure 4:
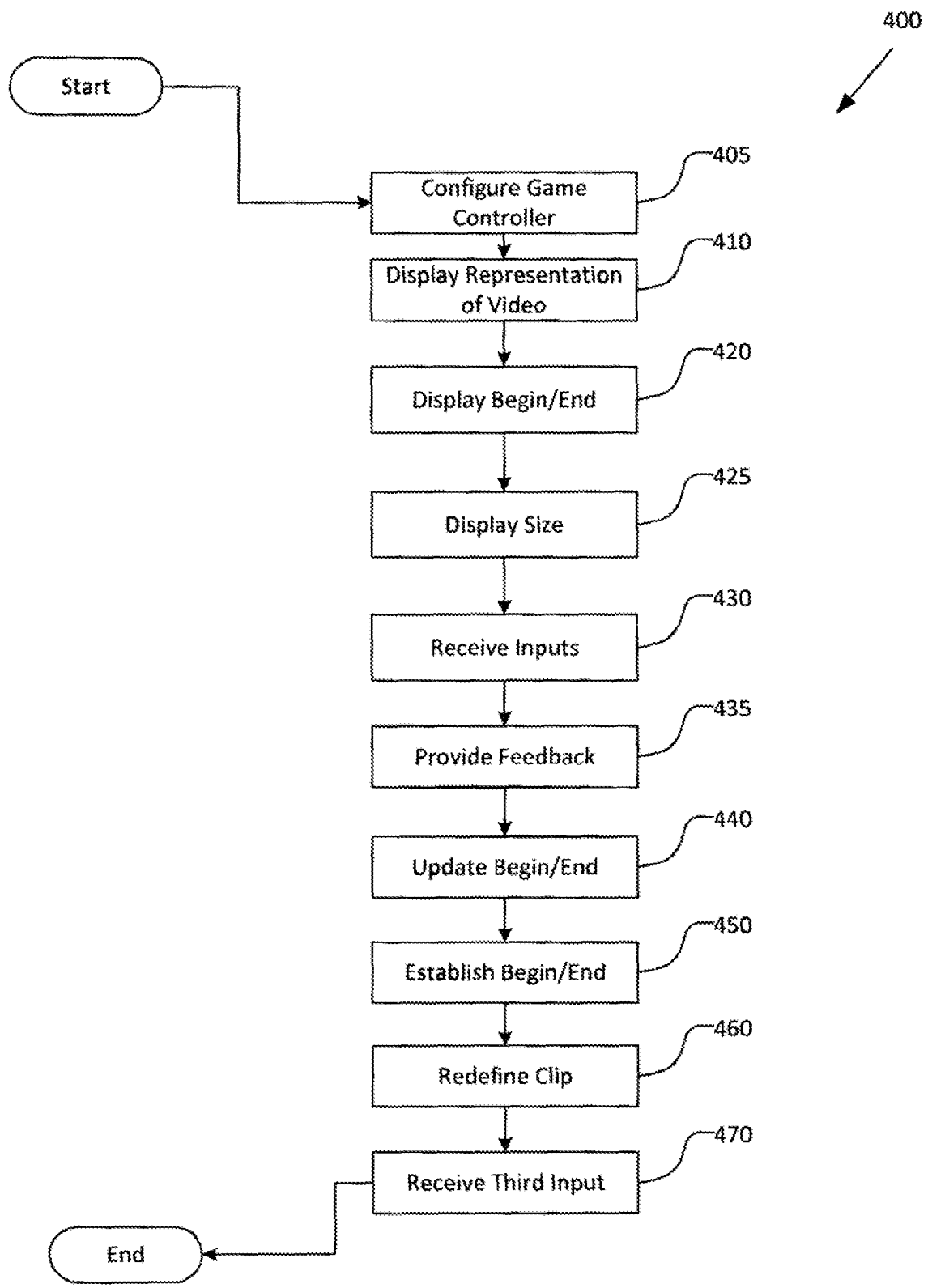
FIG. 4 illustrates an example method associated with controller-based video editing.

FIG. 4 illustrates an example method 400 associated with controller-based video editing. Method 400 includes several actions similar to those described in connection with method 300. For example, method 400 includes displaying a representation of a video at 410, displaying representations of beginning and ending frames at 420, receiving inputs at 430, updating the representations of the beginning and ending frames at 440, establishing the beginning and ending points at 450, and redefining a clip at 460. However, method 400 includes additional, different actions.

For example, method 400 includes, at 405, configuring the game controller so the first input element will control the representation of the beginning point and so the second input element will control the representation of the ending point. Configuring the game controller may include selecting an input element, calibrating an input element, identifying an action performed by the input element and its effect on a representation, or other actions.

Method 400 may also include, at 425, displaying on the device a current size of the clip as determined by the beginning point and the ending point. The size may be displayed in frames, in seconds, or using other measures. In one embodiment, the size may be updated as the representations of the beginning point and ending point are manipulated.

Method 400 may also include, at 435, providing a first feedback upon determining that an attempt has been made to establish the beginning point and the ending point closer together than a pre-defined minimum distance. The first feedback may prevent a user from trying to make a clip that is too short. For example, a minimum clip size of 30 frames or 1 second may be enforced. Similarly, method 400 may also include, at 435, providing a second different feedback upon determining that an attempt has been made to establish the beginning point and the ending point farther apart than a pre-defined maximum distance. The second feedback may prevent a user from trying to make a clip that is too long. For example, a maximum clip size of 300 frames or 10 seconds may be enforced. The first feedback and second feedback may take different forms including, but not limited to, vibrating the game controller that is being used to edit the clip, generating a sound, displaying a graphic, or other action.

Method 400 may also include, at 470, receiving a third input from a third control element on the game controller and manipulating the beginning point or the ending point in response to the third input. For example, the third input may cause the beginning point or the ending point to revert back to the beginning point and ending point that existed before an editing session. In one embodiment, the third input may cause the beginning point or the ending point to be positioned a pre-defined distance apart.

While FIGS. 3 and 4 illustrate various actions occurring in serial, it is to be appreciated that various actions illustrated in FIGS. 3 and 4 could occur substantially in parallel. By way of illustration, a first process could manage frame access and a second process could receive inputs and manipulate graphics that depict how a user wants frames to be managed. While two processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
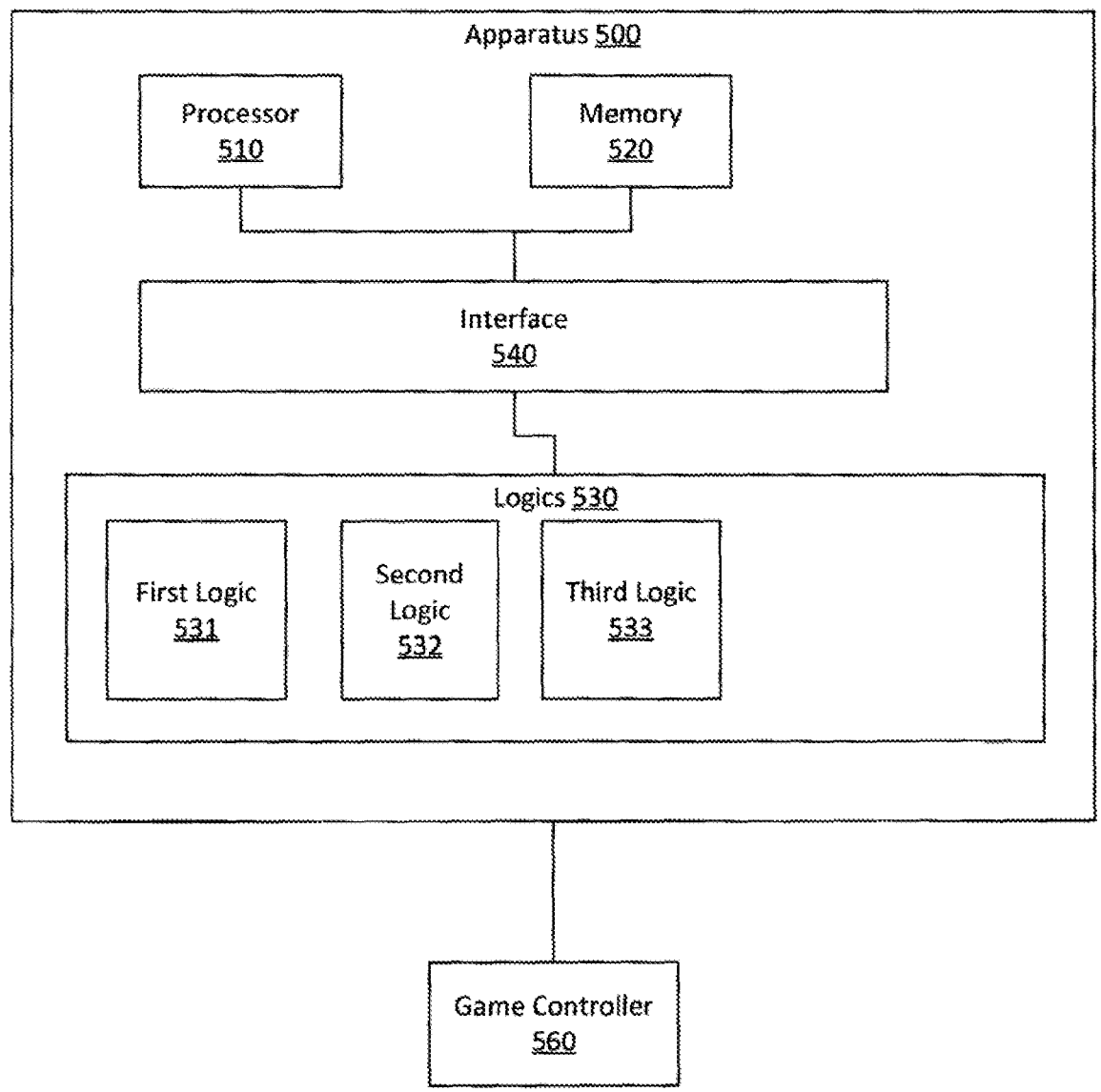
FIG. 5 illustrates an example apparatus associated with controller-based video editing.

FIG. 5 illustrates an example apparatus 500 that is configured to support controller-based video editing. Apparatus 500 may be, for example, a video game console. In one example, the apparatus 500 includes an interface 540 that is configured to connect a processor 510, a memory 520, and a set 530 of logics. Elements of the apparatus 500 may be configured to communicate with each other, but not all connections have been shown for clarity of illustration. In one embodiment, the apparatus 500 may be a general purpose computer that has been transformed into a special purpose computer through the inclusion of the set of logics 530. Apparatus 500 may interact with other apparatus, processes, and services through, for example, a computer network. Apparatus 500 may receive inputs from a game controller 560. The game controller 560 may include a variety of input elements including, but not limited to, a thumb-stick, a wheel, a button, a trigger, a multi-directional pad, and a switch.

The set 530 of logics may be configured to support controller-based video editing. Thus, the set 530 of logics may be configured to identify a contiguous subset of frames in a contiguous set of frames in response to inputs from the game controller 560. In one embodiment, the contiguous set of frames is associated with a video game played on the apparatus 500 while the video game was controlled, at least in part, by the game controller 560. For example, in different embodiments, the contiguous set of frames may be a recording made by the video game that was played, may be an automatic highlight generated by the video game, or may be a recording made by a separate application or device (e.g., DVR).

The set 530 of logics may include a first logic 531 that is configured to identify a starting frame for the contiguous subset of frames as a function of a first input from a first portion of the game controller 560. For example, the first logic 531 may receive inputs from a left thumb-stick that move a first selection window over a representation of the contiguous set of frames. When the first selection window comes to rest for more than a pre-determined period of time, the starting frame may be selected as a function of the position of the first selection window.

The set 530 of logics may also include a second logic 532 that is configured to identify an ending frame for the contiguous subset of frames as a function of a second input from a second, different portion of the game controller 560. For example, the second logic 532 may receive inputs from a right thumb-stick that move a second selection window over a representation of the contiguous set of frames. When the second selection window comes to rest for more than a predetermined period of time, the ending frame may be selected as a function of the position of the second selection window.

In one embodiment, the first logic 531 and the second logic 532 are configured to operate in parallel to simultaneously select the starting frame and the ending frame. Thus, a user may be moving the first selection window and the second selection window at the same time.

The set 530 of logics may also include a third logic 533 that is configured to store, in the memory 520, information concerning the starting frame, the ending frame, and the contiguous subset of frames. The information may include, for example, a frame number for the starting frame, a frame number for the ending frame, a length of the contiguous subset of frames, or other information. In one embodiment, the third logic 532 is configured to prevent the first logic 531 and the second logic 532 from identifying the starting frame and the ending frame at relative positions that violate a predefined position relationship.

Processor 510 may be, for example, a signal processor, a microprocessor, an application specific integrated circuit (ASIC), or other control and processing logic circuitry for performing tasks including signal coding, data processing, input/output processing, power control, or other functions. Processor 510 may be configured to interact with logics 530 that process inputs from a game controller to edit the starting and ending points for a video.

Memory 520 can include non-removable memory or removable memory Non-removable memory may include random access memory (RAM), read only memory (ROM), flash memory, a hard disk, or other memory storage technologies. Removable memory may include flash memory, or other memory storage technologies, such as "smart cards." Memory 520 may be configured to store a highlight video, a collection of highlight videos, a raw clip, an edited clip, video from which a clip may be produced, data associated with a start point, data associated with an end point, or other information.

Figure 6:
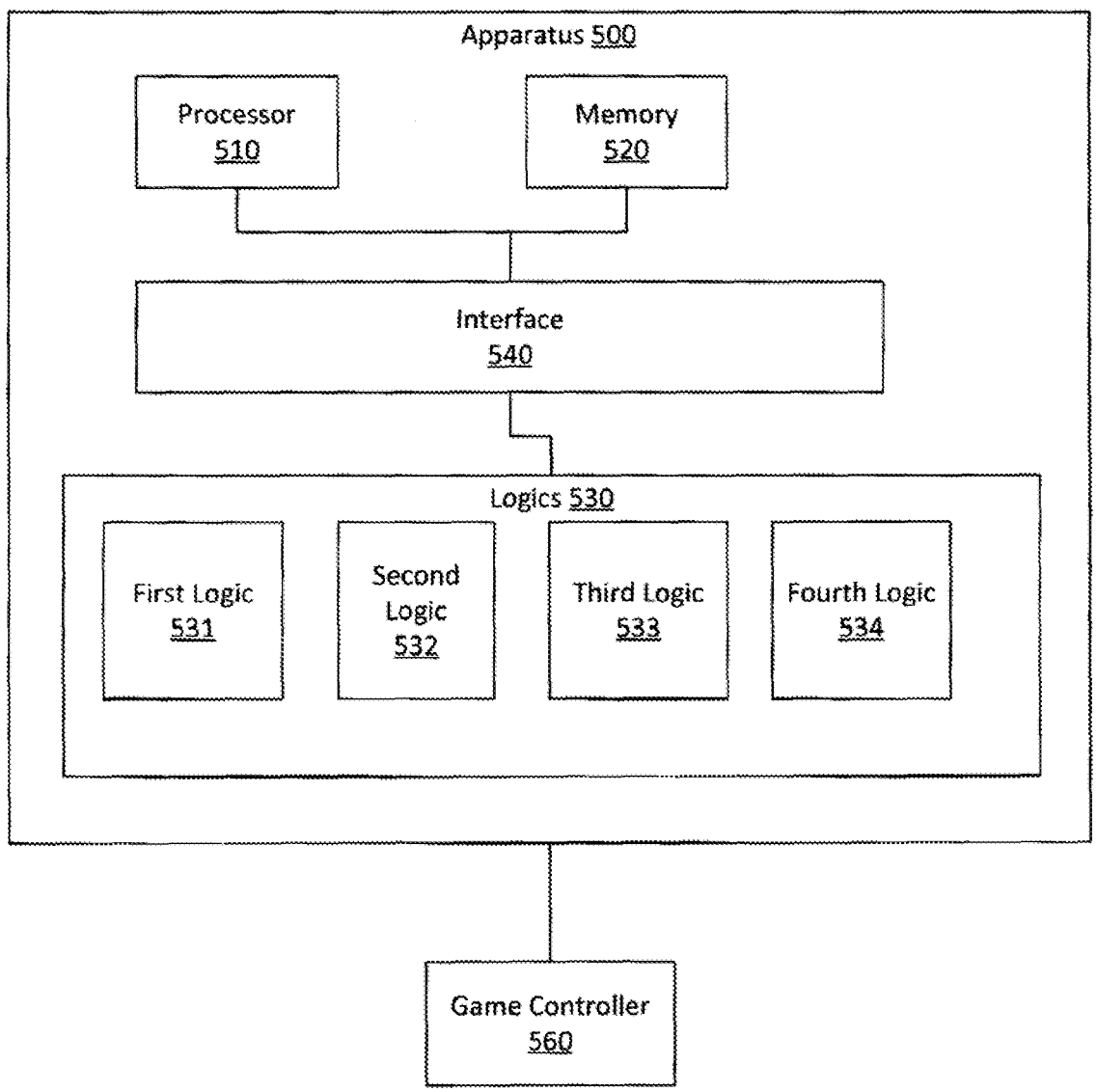
FIG. 6 illustrates an example apparatus associated with controller-based video editing.

FIG. 6 illustrates another embodiment of apparatus 500. This embodiment of apparatus 500 also includes a fourth logic 534. Fourth logic 534 may be configured to display information about the contiguous set of frames on the apparatus 500. The information my include, for example, the size of the contiguous set of frames, a miniaturized representation of the set of frames, scenes found in the contiguous set of frames, or other information. The size may be reported in frames, in seconds, or using other units of measure.

The fourth logic 534 may also be configured to display information about the starting frame on the apparatus 500. The information may include, for example, a frame number, a time in the video from which the starting frame was selected, a miniaturized representation of the scene in the starting frame, the scene in the starting frame, or other information.

The fourth logic 534 may also be configured to display information about the ending frame on the apparatus 500. The information may include, for example, a frame number, a time in the video from which the ending frame was selected, a miniaturized representation of the scene in the ending frame, the scene in the ending frame, or other information.

The fourth logic 534 may also be configured to display, on the apparatus 500, the contiguous subset of frames as defined by the starting frame and the ending frame. Thus, the fourth logic 534 may play the subset of frames (e.g., the highlight clip) so the editor can view the result of selecting the starting frame and the ending frame. Displaying the subset of frames may allow the editor an opportunity to change their selections for the starting frame or the ending frame.

Figure 7:
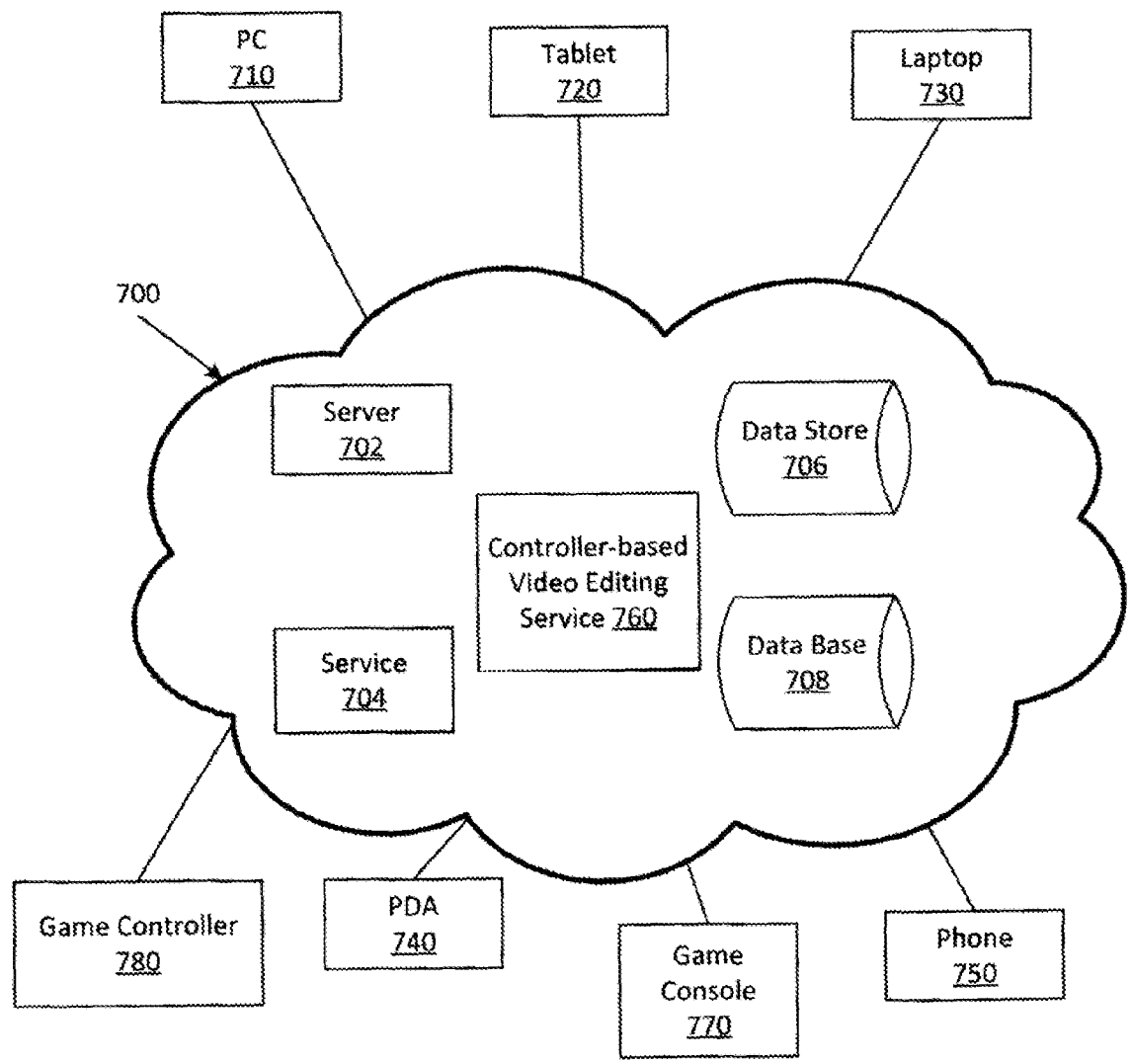
FIG. 7 illustrates an example cloud operating environment in which a controller-based video editing service may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, a game console, or in other ways.

FIG. 7 illustrates an example controller-based video editing service 760 residing in the cloud. The controller-based video editing service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the controller-based video editing service 760.

FIG. 7 illustrates various devices accessing the controller-based video editing service 760 in the cloud. The devices include a computer 710, a tablet 720, a laptop computer 730, a personal digital assistant 740, a mobile device (e.g., cellular phone, satellite phone) 750, a game controller 780, and a game console 770. It is possible that different users at different locations using different devices may access the controller-based video editing service 760 through different networks or interfaces. In one example, the controller-based video editing service 760 may be accessed by a mobile device 750. In another example, portions of controller-based video editing service 760 may reside on a mobile device 750. Controller-based video editing service 760 may perform actions including, for example, establishing a start or entry point for a clip, establishing an end or exit point for a clip, enforcing a minimum clip length, enforcing a maximum clip length, facilitating user-customization of bindings between controller input devices (e.g., thumb-sticks, buttons) and editing actions, or other action. In one embodiment, controller-based video editing service 760 may perform portions of methods described herein (e.g., method 300, method 400).

Figure 8:
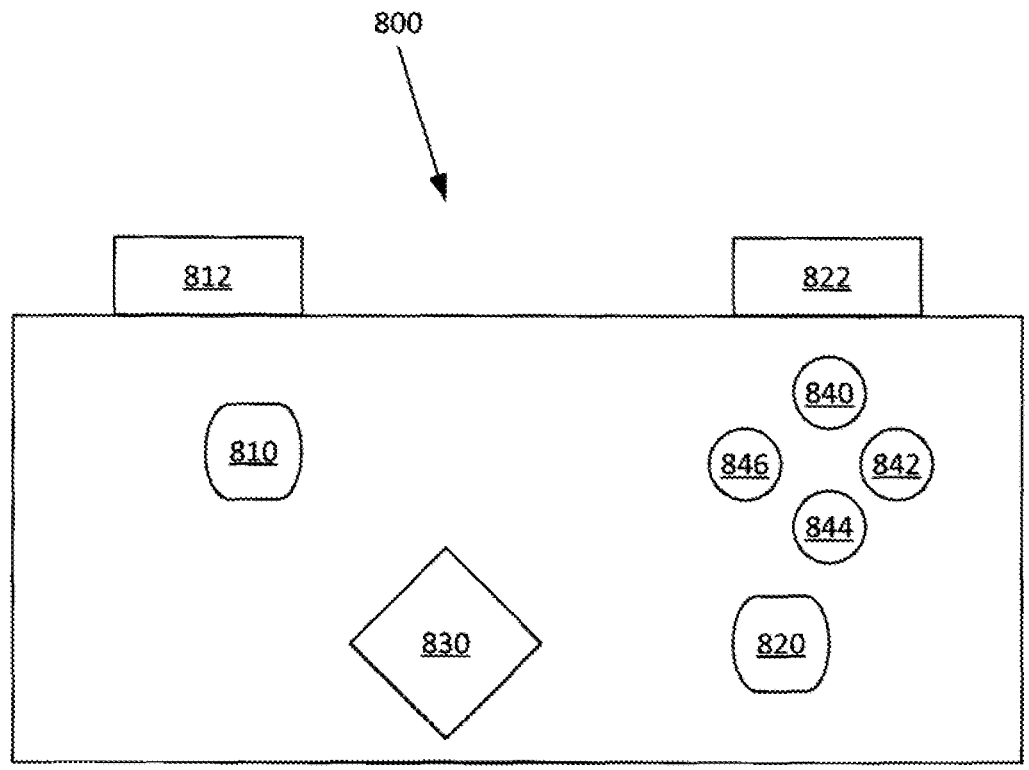
FIG. 8 illustrates an example game controller.

FIG. 8 illustrates an example game controller 800. Game controller 800 may include a variety of elements configured to provide inputs. For example, game controller 800 may include a left thumb-stick 810 and a right thumb-stick 820. The thumb-sticks may be, for example, analog devices that detect and report on the position of a movable arm. The thumb-sticks may be used, for example, to navigate, to control the direction in which a player is moving, to control pitch and roll on an airplane simulator, to aim a weapon, or for other actions. Game controller 800 may also include a d-pad 830 that is a single element that operates as a four-way switch. The four-way switch may be used, for example, to switch between views. Game controller 800 may also include discrete buttons (e.g., button 840, 842, 844, 846). The discrete buttons may be used to perform discrete actions. The game controller 800 may also include a left trigger 812 and a right trigger 822. The triggers may be used to fire weapons, to kick a ball, to shoot a hockey puck, or for other actions. While two thumb-sticks 810 and 820, a d-pad 830, four buttons 840, 842, 844, and 846, and two triggers 812 and 822 are illustrated, a game controller may have more or less elements, may have a different combination of elements, and may have elements arranged in different positions. Example apparatus and methods are configured to simultaneously receive inputs from two controller elements and to simultaneously update a start point and an end point for a clip being clipped from a video. In one embodiment, the two controller elements may be the left thumb-stick 810 and the right thumb-stick 820. In other embodiments, the two controller elements may be other input elements on the controller 800. In one embodiment, the left thumb-stick 810 may be configured to control repositioning the beginning frame for a clip and the right thumb-stick 820 may be configured to control repositioning the ending frame for the clip. In one embodiment, the associations between thumb-sticks and starting or ending frame may be user-configurable.

Figure 9:
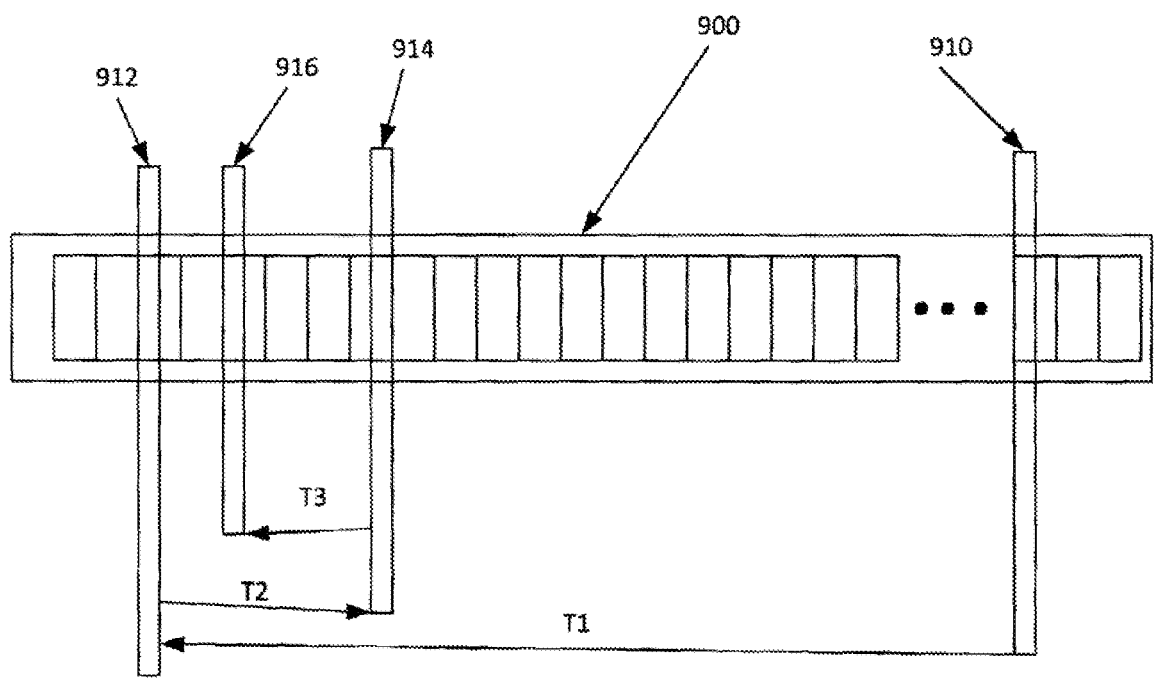
FIG. 9 illustrates a terminal point being moved using controller-based video editing.

FIG. 9 illustrates a terminal point being manipulated using, for example, controller 800 (FIG. 8). A video 900 may be a collection of frames. Initially, a terminal point (e.g., beginning frame, ending frame) 910 may exist for a clip to be edited from the video 900. During a time T1 a user may use a control on a game controller to reposition the terminal point from 910 to 912. The user may, for example, have pressed and held the left thumb-stick 810 all the way to the left. As the control was pressed and held, the rate at which the terminal point moved from right to left may have accelerated. Thus, it is possible that the user may overshoot the intended frame. After time T1, when the terminal point has been moved to location 912, which is 'in the neighborhood', a finer-grained control may be used. For example, during a time T2 the user may press and hold the left thumb-stick 810 partly to the right. As the control was pressed and held, the rate at which the terminal point moved from left to right may have accelerated, but at a slower rate than when the thumb-stick 810 was pressed all the way to a side. Thus, once again, the user may have overshot the intended frame. However, with the terminal point located at 914 after time T2, the user may now be able to exercise even finer-grained control. For example, the user may nudge or flick the thumb-stick 810 to the left to move frame by frame until the desired location 916 is reached. At this point, the user may simply release the thumb-stick 810 to leave the terminal point at the desired location 916. In one embodiment, the user may take an additional action (e.g., press thumb-stick 810 directly up, press trigger 812) to indicate that a new terminal point has been established. This additional action may be seen as "locking in" the selected position. While an additional action is described, in one embodiment no additional action may be undertaken to lock in the selected position. Alternatively, the user may decide that the new point doesn't work and may take another action (e.g., press button 840) to have the terminal point revert to initial location 910.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"logic", as used herein, includes but is not limited to hardware, firmware, software in execution an a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from a device controlled by a game controller, video generated from a video game played on the device while the video game was controlled by the game controller, where the video comprises a collection of frames, displaying, on the device, a representation of the received video;

displaying, on the device, a representation of a beginning point for a clip in the video, where the clip comprises a subset of the collection of frames;

displaying, on the device, a representation of an ending point for the clip in the video;

receiving a first input from a first input element on the game controller;

receiving a second, different input from a second element on the game controller;

providing a first feedback upon determining that an attempt has been made to establish the beginning point and the ending point closer together than a pre-defined minimum distance, and providing a second different feedback upon determining that an attempt has been made to establish the beginning point and the ending point farther apart than a pre-defined maximum distance, selectively updating the representation of the beginning point in response to the input from the first input element;

selectively updating the representation of the ending point in response to the input from the second input element;

establishing the beginning point based on the representation of the beginning point;

establishing the ending point based on the representation of the ending point, and redefining the clip based, at least in part, on the beginning point and the ending point.

2. The method of claim 1, comprising receiving the first input and receiving the second input simultaneously.

3. The method of claim 2, comprising simultaneously updating the representation of the beginning point and the representation of the ending point.

4. The method of claim 1, where the first input element is a left thumb-stick and the second input element is a right thumb-stick.

5. The method of claim 1, comprising:

configuring the game controller so the first input element will control the representation of the beginning point, and configuring the game controller so the second input element will control the representation of the ending point.

6. The method of claim 1, comprising importing the video from a device other than the device controlled by the game controller.

7. The method of claim 1, where the game controller is a virtual game controller displayed on an apparatus with a touch or hover sensitive input/output element.

8. The method of claim 1, comprising:

receiving a third input from a third control element on the game controller and manipulating the beginning point or the ending point in response to the third input.

9. The method of claim 1, comprising:

displaying on the device a current size of the clip as determined by the beginning point and the ending point.

10. The method of claim 1, comprising:

moving the representation of the beginning point at a first rate when the first input results from the first input element being manipulated in a first way and moving the representation of the beginning point at a second, different rate when the first input results from the first input element being manipulated in a second different way, and moving the representation of the ending point at the first rate when the second input results from the second input element being manipulated in the first way and moving the representation of the ending point at the second, different rate when the second input results from the second input element being manipulated in the second different way.

11. A computer-readable storage device storing computer-executable instructions that when executed by a computer cause the computer to perform a method, the method comprising:

displaying, on a device controlled by a game controller, a representation of a video, where the video comprises a collection of frames, where the video was generated from a video game played on the device while the device was controlled by the game controller and while the video game was controlled by the game controller, or where the video was imported from a device other than the device controlled by the game controller;

displaying, on the device, a representation of a beginning point for a clip in the video, where the clip comprises a subset of the collection of frames;

displaying, on the device, a representation of an ending point for the clip in the video;

configuring the game controller so a first input element will control the representation of the beginning point and so a second input element will control the representation of the ending point;

simultaneously receiving a first input from the first input element on the game controller and receiving a second, different input from the second input element on the game controller;

simultaneously selectively updating the representation of the beginning point in response to the input from the first input element and selectively updating the representation of the ending point in response to the input from the second input element;

moving the representation of the beginning point at a first rate when the first input results from the first input element being manipulated in a first way and moving the representation of the beginning point at a second, different rate when the first input results from the first input element being manipulated in a second different way, and moving the representation of the ending point at the first rate when the second input results from the second input element being manipulated in the first way and moving the representation of the ending point at the second, different rate when the second input results from the second input element being manipulated in the second different way;

establishing the beginning point based on the representation of the beginning point;

establishing the ending point based on the representation of the ending point;

receiving a third input from a third control element on the game controller and manipulating the beginning point or the ending point in response to the third input;

providing a first feedback upon determining that an attempt has been made to establish the beginning point and the ending point closer together than a pre-defined minimum distance, and providing a second different feedback upon determining that an attempt has been made to establish the beginning point and the ending point farther apart than a pre-defined maximum distance;

displaying on the device a current size of the clip as determined by the beginning point and the ending point, and redefining the clip based, at least in part, on the beginning point and the ending point.

12. An apparatus, comprising:

a processor;

a display;

a memory;

a set of logics configured to receive, from a device controlled by a game controller, video generated from a video game played on the device while the video game was controlled by the game controller, where the video comprises a contiguous set of frames, the set of logics configured to identify a contiguous subset of frames in the received contiguous set of frames, and an interface to connect the processor, the display, the memory, and the set of logics, the set of logics comprising:

a first logic configured to identify a starting frame for the contiguous subset of frames as a function of a first input from a first portion of the game controller;

a second logic configured to identify an ending frame for the contiguous subset of frames as a function of a second input from a second, different portion of the game controller, and a third logic configured to store, in the memory, information concerning the starting frame, the ending frame, and the contiguous subset of frames, where the third logic is configured to prevent the first logic and the second logic from identifying the starting frame and the ending frame at relative positions that violate a pre-defined position relationship.

13. The apparatus of claim 12, where the first logic and the second logic are configured to operate in parallel to simultaneously select the starting frame and the ending frame.

14. The apparatus of claim 13, comprising a fourth logic configured:

to display information about the contiguous set of frames on the apparatus;

to display information about the starting frame on the apparatus;

to display information about the ending frame on the apparatus, and to display, on the apparatus, the contiguous subset of frames as defined by the starting frame and the ending frame.

15. The apparatus of claim 12, where the first logic is configured to identify the starting frame as an offset into a collection of frames to which the contiguous subset of frames are bound and were the second logic is configured to identify the ending frame as a function of a duration of the collection of frames to which the contiguous subset of frames are bound.

* * * * *